US008451817B2

(12) United States Patent
Cheriton

(10) Patent No.: US 8,451,817 B2
(45) Date of Patent: May 28, 2013

(54) METHOD AND APPARATUS FOR PROCESSING DUPLICATE PACKETS

(75) Inventor: David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1096 days.

(21) Appl. No.: 10/626,792

(22) Filed: Jul. 24, 2003

(65) Prior Publication Data

US 2005/0018668 A1    Jan. 27, 2005

(51) Int. Cl.
*H04J 3/24* (2006.01)
(52) U.S. Cl.
USPC .......................... 370/349; 370/389; 709/224
(58) Field of Classification Search
USPC ................ 370/229, 349, 351, 389, 392, 401, 370/232, 395.5, 345; 710/58; 365/189.05; 709/224; 726/24; 713/201
See application file for complete search history.

(56) References Cited

U.S. PATENT DOCUMENTS

| | | | | |
|---|---|---|---|---|
| 5,455,826 A | * | 10/1995 | Ozveren et al. ............... | 370/232 |
| 5,602,781 A | * | 2/1997 | Isobe ....................... | 365/189.05 |
| 5,832,233 A | | 11/1998 | Hall et al. ................ | 395/200.66 |
| 6,381,660 B1 | * | 4/2002 | Ito ..................... | 710/58 |
| 6,446,131 B1 | * | 9/2002 | Khansari et al. .............. | 709/238 |
| 6,810,021 B1 | * | 10/2004 | Sakurai .......................... | 370/255 |
| 7,453,886 B1 | * | 11/2008 | Allan ......................... | 370/395.5 |
| 2003/0097439 A1 | * | 5/2003 | Strayer et al. ................. | 709/224 |
| 2003/0115485 A1 | * | 6/2003 | Milliken ....................... | 713/201 |
| 2003/0189916 A1 | * | 10/2003 | Cornett et al. ................ | 370/345 |
| 2004/0267945 A1 | * | 12/2004 | Reiss ............................ | 709/229 |
| 2005/0022009 A1 | * | 1/2005 | Aguilera et al. .............. | 713/201 |

FOREIGN PATENT DOCUMENTS

| | | |
|---|---|---|
| WO | WO 00/56024 | 9/2000 |
| WO | WO 03/013102 | 2/2003 |

OTHER PUBLICATIONS

Liang, Zhengang; Hassanein, Hossam; Martin, Patrick; *Transparent Distributed Web Caching*; Department of Computing and Information Science Queen's University; Nov. 14, 2001; IEEE, pp. 225-233.

* cited by examiner

*Primary Examiner* — Kwang B. Yao
*Assistant Examiner* — Jeffrey M Ruthkowski
(74) *Attorney, Agent, or Firm* — Campbell Stephenson LLP

(57) ABSTRACT

A method and apparatus for determining if a packet is a duplicate packet are disclosed. The method includes determining if a field of a duplicate packet map (DPM) indicates the packet is the duplicate packet. The determination is made using a packet summary value (PSV) corresponding to the packet. The apparatus (a network device, for example) includes a duplicate packet map (DPM), which can be used to make the foregoing determination.

73 Claims, 10 Drawing Sheets

METHOD AND APPARATUS FOR PROCESSING DUPLICATE PACKETS

BACKGROUND OF THE INVENTION

1. Field of the Invention

This invention relates to the field of information networks, and more particularly relates to a method and apparatus for identifying duplicate packets.

2. Description of the Related Art

As more and more information is transferred over today's networks, businesses have come to rely heavily on their network infrastructure in providing their customers with timely service and information. Failures in such network infrastructures can be costly both in terms of lost revenue and idled employees. Thus, high reliability systems are becoming increasingly attractive to users of networking equipment. Moreover, the manufacturers of routers, switches and other such network elements are constantly called upon to provide network elements that support ever-increasing network traffic loads, while still maintaining such high reliability. These demands force network elements to provide increased packet processing rates, typically through substantial increases in processing power.

For network environments requiring such high availability, one approach to providing failsafe connections is to transmit each packet multiple times, once over several (or all) independents paths from source to destination. With independent paths, it is normally sufficient to provide two paths and transmit the packet just twice because of the low probability of these two paths failing simultaneously. This approach provides essentially zero fail-over time, because, if one path fails, a copy of the packet is received on the other path (at least, with high probability).

In contrast, other schemes typically entail some sort of delay. This may include delays such as the delay associated with the detection of the active path's failure, the delay associated with switching packet forwarding to an alternative path and the delay associated with the retransmission of packet traffic that was dropped during the switchover (which is normally handled by end hosts). This delay can stretch into seconds, as a result of protocol timeouts and settling time for routing reconfiguration, particularly over long-haul links.

Thus, despite the attractions of multiple packet transmission techniques over other alternatives, such approaches present a number of challenges. One issue is the extra bandwidth required to send each packet twice. However, the second path's bandwidth is required in any case on failure of the first, so one can often argue that this bandwidth is being wasted in the absence of failure in any case, either by being left idle (and so available for use in the event of a failure) or by transporting these duplicates (which are used in the event of a failure). A second challenge is directing packets on two independent paths. In the case of separate Layer 1 paths, there are normally two physical links out of the source, such as two fiber optic connections between source and destination, such that the duplicate transmission takes place at the physical MAC layer. At higher layers, the source may be able to "source route" the packet along two independent paths using the facilities provided by those layers. For example, an enterprise router may be connected to two separate service providers (SPs) and transmit the packet simultaneously over the link to each separate SP. In addition, the internet protocol (IP) Loose Source Route Option (LSRO) and multiple path label switching (MPLS) can be used in environments that support such mechanisms.

It should be noted that, in providing a reliable connection in the manner outlined above, such a technique must prevent duplicate packets from being delivered to the end host. This is of particular relevance when providing this availability feature in the network layer, transparent to end hosts (which typically connect subnets over some exposed long-haul connection), because the duplicate packets consume resources at the end host and on the end host's network. Moreover, in some cases, these duplicate packets can interfere with the operation of the end host's protocols. Such duplicate packets also violate the standard semantics of the network layer as a service, which is not supposed to duplicate packets. However, the network layer cannot rely on a sequence number to detect duplicates, such as that available in reliable transport protocols (e.g., the transport control protocol (TCP)).

What is therefore desired is the ability to provide reliable network connectivity through the transmission of duplicate packets along different paths without adversely affecting network efficiency significantly. Such functionality should also be provided in a manner that does not adversely impact the processing capabilities (i.e., packet throughput) of network elements employing such a solution. Preferably, a network element employing such a solution should also be capable of defending both itself and the network against attacks that employ large numbers of packets to disrupt network operations.

SUMMARY OF THE INVENTION

In one embodiment, a network device is disclosed. The network device includes a duplicate packet map (DPM). In certain aspects of this embodiment, the DPM includes a plurality of DPM fields. In other aspects of this embodiment, the DPM is configured to receive a packet summary value (PSV).

In another embodiment, a method for determining if a packet is a duplicate packet is disclosed. The method includes determining if a field of a duplicate packet map (DPM) indicates the packet is the duplicate packet. The determination is made using a packet summary value (PSV) corresponding to the packet.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

The use of the same reference symbols in different drawings indicates similar or identical items.

DETAILED DESCRIPTION

Figure 1:
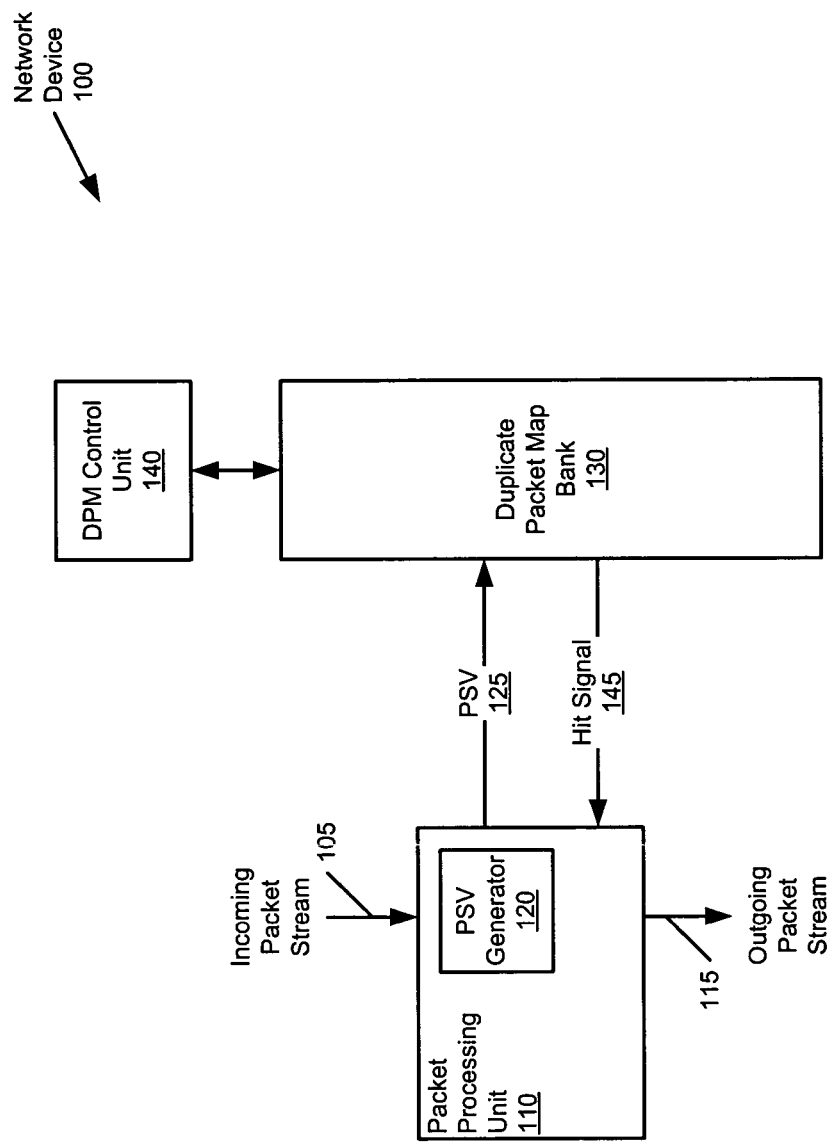
FIG. 1 is a block diagram illustrating a network device that incorporates embodiments of the present invention.

The following is intended to provide a detailed description of an example of the invention and should not be taken to be limiting of the invention itself. Rather, any number of variations may fall within the scope of the invention which is defined in the claims following the description.

Introduction

The invention provides a method and apparatus that detects duplicate packets by hashing information regarding the packet, and comparing that hash value to a stored value representing the hash values of the packets previously received, in order to determine if the packet is a duplicate (i.e., has already been "seen" by the network device). The value generated by the hash function can be compared with the stored value, for example, on a bit-by-bit basis. If the packet is a duplicate (i.e., the stored value includes information indicating that such a packet has already been received by the network device), the packet is dropped. If the packet is not a duplicate, the packet's hash information is added to the stored hash information, and the packet is forwarded in the appropriate manner. The hash function can be any such function, but the more highly randomized the hash, the fewer false positives are generated. It will also be appreciated that the more bits generated and stored, the more accurate the determination, but also, the greater the relative cost.

More particularly, a network device according to the present invention includes a packet summary value (PSV) generator configured to extract a PSV from each packet received. The network device also includes a duplicate packet map (DPM) bank that includes at least one DPM. In one embodiment, each DPM provides one entry per PSV. When a packet is received, a PSV is generated for the packet. Using this PSV, the packet is "looked up" in the DPM (i.e., the PSV is matched to the information in the DPM). If the information in the DPM indicates that a packet with this PSV has been received, the packet is classified as a duplicate and handled accordingly (typically, dropped). Otherwise, this entry is updated to indicate the reception of a packet with the given PSV, the packet is classified as a non-duplicate and forwarded accordingly.

In one embodiment of the present invention, the DPM is a 2-field entry, with one field corresponding to a previous time interval Tp and another field corresponding to the current time interval Tc. On packet reception, if the entry corresponding to this packet's PSV has either field set, the packet is classified as a duplicate. Otherwise, the field in the entry corresponding to the current time interval (Tc) is set. These time intervals correspond to intervals of real-time. At the end of the current time interval (Tc), the fields in the DPM corresponding to the previous time interval (Tp) are cleared and are then treated as fields corresponding the new current time interval while those previously treated as current are then treated as previous for the next time interval. This time interval is referred to herein as a time interval change (TIC). If each time interval is t milliseconds in length, a packet is then treated as recently received if a packet with the same PSV was received within the last t to 2t milliseconds, depending on the exact current time relative to the last TIC. In particular, at the moment a TIC has just occurred, packets received within the last t milliseconds are classified as duplicates whereas just before a TIC occurs, packets received within the last 2t milliseconds are classified as duplicates.

This scheme can be extended to multiple fields per entry with the corresponding increase in space and fabrication costs. In a manner similar to that just discussed, the fields associated with the oldest time interval are cleared on each TIC and then associated with the new time interval, with the previously next-to-oldest field then being designated as the oldest field. This extension can be used to provide a finer granularity of control over the variation in the time period considered "recent" for purposes of duplicate suppression. In fact, by adjusting the TIC value (as well as the number of DPMs used, of those available), one can dynamically configure the window size (the period of time in which the reception of duplicate packets results in the determination that the later-received duplicate packets as being duplicates). However, whether two or more DPMs are implemented, redesignating DPM fields is relatively straightforward to implement (whether in hardware or software) because doing so only affects which DPM is set on packet reception and which DPM is cleared on each TIC.

A network device implementing an embodiment of the present invention offers several advantages, including the following. Such a network device (e.g., switch or router) can support duplicate packet transmission on independent paths for zero failover, as described earlier, without delivering a significant number of duplicate packets to the end hosts. Such a network device can also suppress duplicates arising from failures, misconfigurations and attacks.

It will be appreciated that, however, use of the present invention is also appropriate in a scenario in which each packet is sent multiple times (e.g., twice) on the same link. Of course, in using such an approach, the sending of duplicate packets over the link must be feasible, considering issues such as, for example, the sufficiency of the given link's available bandwidth and excessive packet drop on the link (in contrast to a failure of the link).

Because a method according to the present invention employs standard packet formats (i.e., no modifications need be made (e.g., no information need be added) to the packets), such methods do not involve the modification of the standard protocols currently used in existing network devices. Moreover, because the method can be implemented in hardware, the packet throughput of a network device employing the present invention is not significantly affected, and may, in fact, suffer no degradation whatsoever.

Example of an Apparatus for Duplicate Packet Detection

FIG. 1 is a block diagram illustrating the architecture of a network device 100 according to embodiments of the present invention. Network device 100 receives an incoming packet stream 105 at a packet processing unit 110. Once processed by packet processing unit 110, incoming packet stream 105 is forwarded by network device 100 as an outgoing packet stream 115. The packets of incoming packet stream 105 are processed within packet processing unit 110, in part, by a packet summary value (PSV) generator 120. PSV generator 120 generates a PSV 125, which is passed to a duplicate packet map (DPM) bank 130. DPM bank 130 is controlled by a DPM control unit 140. If DPM bank 130, in conjunction with DPM control unit 140, determines that the value presented as PSV 125 indicates a duplicate packet, this condition is communicated to packet processing unit 110 via a hit signal 145. Similarly, if the value presented as PSV 125 does not cause DPM bank 130 to generate a hit, the fact that the packet in question is not a duplicate is likewise indicated using hit signal 145. If the packet is not a duplicate, the entry corresponding to the value of PSV 125 (i.e., the packet in question) in DPM bank 130 is updated to indicate the packet's reception (for use in identifying duplicates of this packet, in the future). Once the determination as to whether or not the given packet is a duplicate has been made, packet processing unit 110 can then process the given packet appropriately, based on this information.

In the present invention, PSV generator 120 of network device 100 extracts packet summary value (PSV 125) from each packet and passes that PSV to DPM bank 130. DPM bank 130 includes a duplicate packet map (DPM), which can be configured in a number of ways. Such a DPM can include one entry per PSV, or can map a PSV to the bits therein. When a packet is received, the packet is looked up in the DPM based on its PSV. If the DPM entry indicates that a packet with this PSV was received recently, the packet is classified as a duplicate and handled accordingly (typically, dropped). Otherwise, this entry is updated to indicate the recent reception of a packet with this PSV, and the packet is classified as a non-duplicate and forwarded accordingly.

In such an architecture, DPM bank 130 (and more particularly, the DPM(s) within DPM bank 130) can be implemented using a Bloom filter. A Bloom filter is a simple space-efficient, randomized data structure for representing a set in order to support approximated membership queries. The space efficiency is achieved at the cost of a small probability of false positives that result from the fact that not all packets received map to unique PSVs, but this is a convenient trade-off in the present application. With an acceptably low probability of false positives, the Bloom filter provides a good solution to the need for a space-efficient mechanism for maintaining information regarding packets already received. Using this approach, each DPM is designed to implement a Bloom filter for the given window (the period of time during which duplicate packets are checked against packets recently received). In such a scenario, each DPM (Bloom filter) begins as an array of all 0's. Each packet is hashed a number of times (e.g., k times) to form its corresponding PSV, as noted, with each hash yielding a bit location in the DPM. These bit locations are set (e.g., to 1). To check if a newly received packet is a duplicate (i.e., that its PSV is in the set of PSVs stored in the DPM), the newly received packet is hashed k times and the corresponding bits checked. If the corresponding bits are all 1's, the PSV is matched, and the packet is a duplicate (at least, with some level of confidence). Otherwise, the PSV has not been matched, and the packet is a not duplicate. In the latter case, the bits of the DPM corresponding to the PSV are set (e.g., to 1), to record the receipt of that packet.

The probability of false positives is governed, in an approximation, by the number of hashing functions (k), the number of packets expected to be analyzed during a given time period (n) and the number of bits in each DPM (m). In one implementation, a relationship can be derived that minimizes the number of hashing functions employed, given a number of packets to be analyzed and a number of bits in each DPM, which is given as:

$$k = \ln 2 * (m/n)$$

In the situation where only a single hashing function is used, this equation devolves to:

$$m = 0.6932/n$$

where, in practice, the size of a DPM is limited to whole numbers (and likely, even numbers) of bits. Thus, in this representation, the number of bits needed for each DPM is governed by the number of packets to be analyzed (and thus, the length of the time interval during which packets are to be checked for duplication) for a given probability of false positives.

In one embodiment of the present invention, a single hash function is used. In this embodiment, the PSV is realized using cyclic redundancy check (CRC) computations, performed on the contents of the packet at the transport layer. Such computations would typically exclude lower-layer header and trailer information, which might be dependent on the path taken by the packet. A CRC computation is attractive because such a computation tends to ensure differences in the PSV as a result of any difference in the packet, compared to the weaker properties of a conventional software checksum, for instance. A CRC computation is also readily implemented in hardware. However, as noted, other hash functions, as well as multiple hash functions, can be used. The PSV may selectively include destination/forwarding information, such that an identical transport-layer packet sent to a different destination is not considered a duplicate.

In one embodiment of the present invention, the DPM bank is made up of two DPMs, with one DPM corresponding to a previous time interval Tp and another DPM corresponding to the current time interval Tc. On packet reception, if the entry corresponding to the given packet's PSV has either DPM set, the packet is classified as a duplicate. Otherwise, the field in the entry corresponding to the current time interval is set. These time intervals correspond to intervals of real-time. At the end of the current time interval Tc, the fields in the DPM corresponding to the previous time interval are cleared and are then treated as fields corresponding the new current time interval, while those previously treated as current are now treated as previous for the next time interval. This time interval is referred to herein as a time interval change (TIC). If each time interval is t milliseconds long, a packet is then treated as recently received if a packet with the same PSV was received within the last t to 2t milliseconds, depending on the exact current time relative to the last TIC. In particular, at the moment a TIC has just occurred, packets received within the last t milliseconds are classified as duplicates whereas just before a TIC occurs, packets received within the last 2t milliseconds are classified as duplicates. An architecture supporting such an approach is now discussed in connection with FIG. 2.

Figure 2:
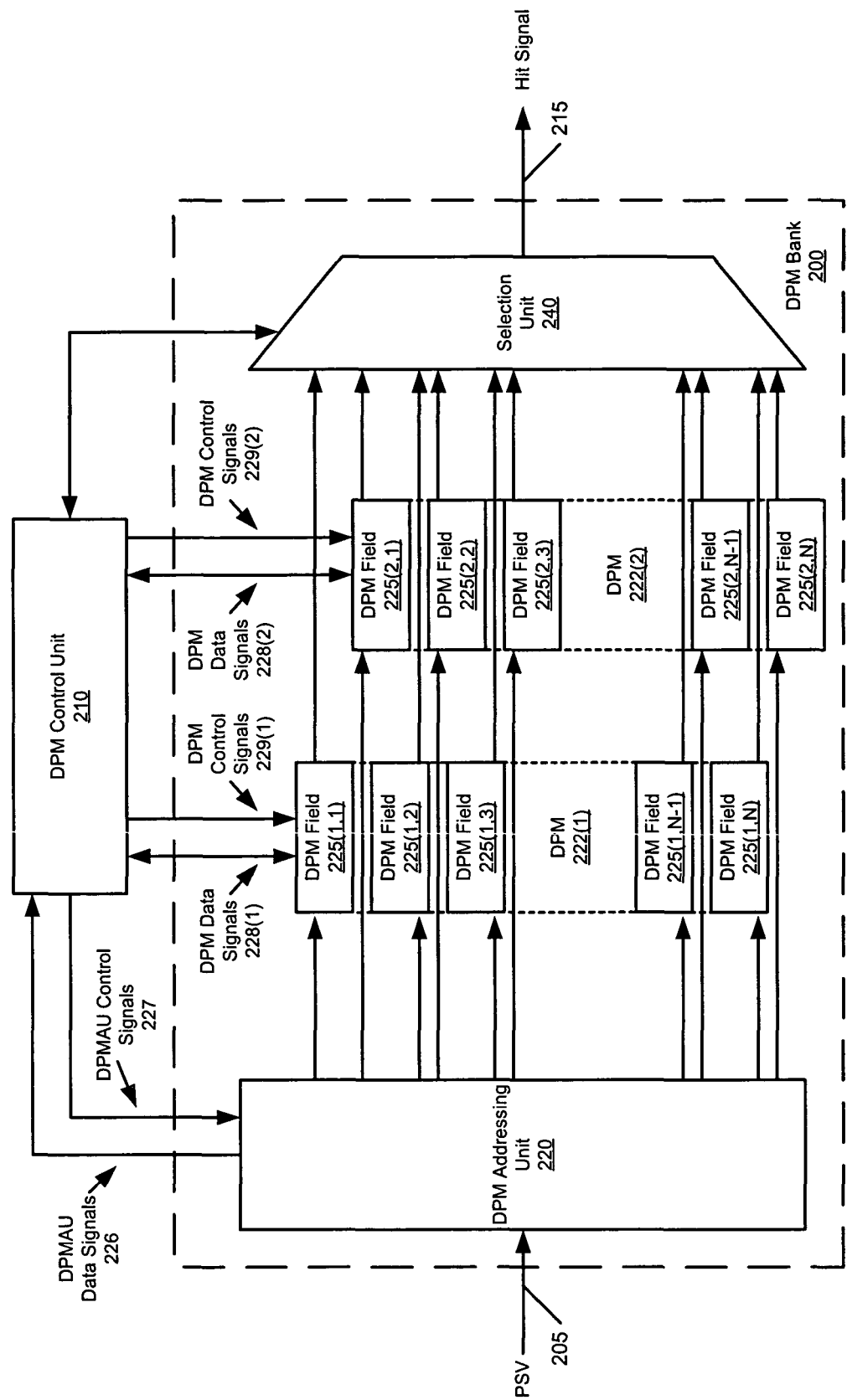
FIG. 2 is a block diagram illustrating a duplicate packet map (DPM) bank with two DPMs according to embodiments of the present invention.

FIG. 2 is a block diagram illustrating DPM bank 130 and DPM control unit 140 in greater detail. In FIG. 2, a DPM bank 200 receives a PSV 205 and, under the control of a DPM control unit 210, generates a hit signal 215. DPM bank 200 receives PSV 205 at a DPM addressing unit 220. DPM addressing unit 220 determines which ones of a number of DPMs (depicted in FIG. 2 as DPMs 222(1)-(2) (which, in turn, include DPM fields 225(1,1)-(2,N))) are to be accessed based on the value of PSV 205. DPM addressing unit (DPMAU) 220 provides such functionality under the control of DPM control unit 210, by providing DPM control unit 210 with DPMAU data signals 226, and, in turn, receiving DPMAU control signals 227. DPM control unit 210 is also configured to read information from DPM fields 225(1,1)-(2, N) via DPM data signals 228(1)-(2). In a similar fashion, DPM control unit 210 controls DPM fields 225(1,1)-(2,N) via DPM control signals 229(1)-(2).

In order to make a determination as to whether or not hit signal 215 should be asserted, in light of the value of PSV 205 (i.e., indicate that the packet represented by PSV 205 is a duplicate), the values of appropriate ones of DPM fields 225 (1,1)-(1,N) and DPM fields 225(2,1)-(2,N) are examined. In one scenario, this is accomplished in the following manner. DPMAU 220 provides DPMAU data signals 226 to DPM control unit 210, which provides DPMAU control signals 227 in response. DPMAU control signals 227 cause the assertion of read lines for the appropriate ones of DPM fields 225(1, 1)-(2,N). This causes the selected ones of DPM fields 225(1, 1)-(2,N) to present their contents at their outputs. Based on their contents (determined via DPM data signals 228(1)-(2)), DPM control unit 210 also sets those DPM fields that are not already set. DPM data signals 228(1)-(2) and DPM control signals 229(1)-(2) also allow DPM control unit 210 to clear the appropriate one of DPMs 222(1)-(2) when exchanging current and previous DPMs.

The outputs are provided to a selection unit 240, which, under the control of DPM control unit 210 (and based on the value of DPM data signals 228(1)-(2)), selects the appropriate ones of the outputs of DPM fields 225(1,1)-(2,N). After the selection is made, selection unit 240 AND's those outputs together, and OR's the results to arrive at hit signal 215. Thus, if all the selected bits of either of DPMs 222(1)-(2) indicate that the packet represented by PSV 205 is a duplicate, that fact is indicated by hit signal 215.

It should be noted that, in fact, the bitlines of PSV 205 can simply be passed to DPMs 222(1)-(2), and input enable signals used to determine which of DPMs 222(1)-(2) (or both) are to use PSV 205 in determining the value of hit signal 215. In that case, DPM addressing unit 220 serves only to provide DPMAU data signals 226 to DPM control unit 210, for use by DPM control unit 210 in generating DPM control signals 229(1)-(2) (which, in this case, would be enable signals discussed here). In this scenario, DPM data signals 228(1)-(2) can be used by DPM control unit 210 to determine the state of each of DPM fields 225(1,1)-(2,N).

It should also be noted that, in other implementations, DPM fields 225(1,1)-(2,N) can include circuitry (and so, functionality) to allow each of DPM fields 225(1,1)-(2,N) to perform the addressing and comparisons necessary to generate the outputs previously discussed. In that case, PSV 205 would be passed to DPM fields 225(1,1)-(2,N), which would then perform the read function and provide the requisite outputs to selection unit 240, as well as set themselves, in order to store the value of PSV 205.

It will be noted that the variable identifier "N" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there is inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of network device 100). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

The approaches discussed in connection with FIGS. 1 and 2 can be extended to architectures having multiple fields per entry (i.e., multiple DPMs), albeit with a corresponding increase in space and fabrication costs. In a manner similar to that discussed previously, the DPM associated with the oldest time interval is cleared on each TIC and then associated with the new time interval, with the previously next to oldest DPM now being designated as the oldest DPM. This extension can be used to provide finer granularity control over the variation in the time period considered "recent" in duplicate suppression. However, whether two or more DPMs are implemented, the redesignation of DPMs is relatively straightforward to implement in hardware or software, as the redesignation only affects which DPM is set on packet reception and which DPM is cleared on each TIC.

The time interval between TICs can be made configurable. However, the interval should be set such that it is greater than the expected differential between duplicate packet arrivals, but less than the time between transport packet retransmission times. For example, on a WAN link say across the continental United States, the transit time is typically in the range of 30-50 milliseconds. In such a scenario, one might allow a jitter in packet reception times of approximately 15 milliseconds, for example, and set the time between TICs to be 15 milliseconds. Even with TCP's "fast retransmit," the sender would need to receive 3 duplicate ACKs corresponding to 3 out-of-order packets at the receiver to cause a retransmission, so the last hop router would not see the retransmitted packet until at least approximately 60 to 100 milliseconds after seeing the original packet. Thus, it would not classify the transport-layer retransmission as a duplicate.

Clearing the fields in each TIC is achieved in some embodiments (e.g., certain hardware implementations) by slicing the DPM fields of the DPM bank across separate banks of memory and applying a reset to the bank corresponding to the fields (DPM) to be cleared. In another embodiment, a simple state machine is used to incrementally clear the oldest field in each entry on a given TIC. It is not mandatory to have all these oldest DPM fields be cleared immediately on each TIC, but the clearing of DPM fields should occur within a (reasonable) bounded period of time from a TIC time. To ensure this clearing occurs in a timely manner, an extra DPM can be employed. Using such an approach, the extra DPM is taken out of service relative to packet reception on a TIC when that DPM is holding the oldest field and a previously out of service bank is added back into service as the newest bank. While "out of service," the state machine has exclusive access to this previously oldest bank so that the DPM's fields can be cleared. Such an implementation is presented in connection with FIG. 3.

Figure 3:
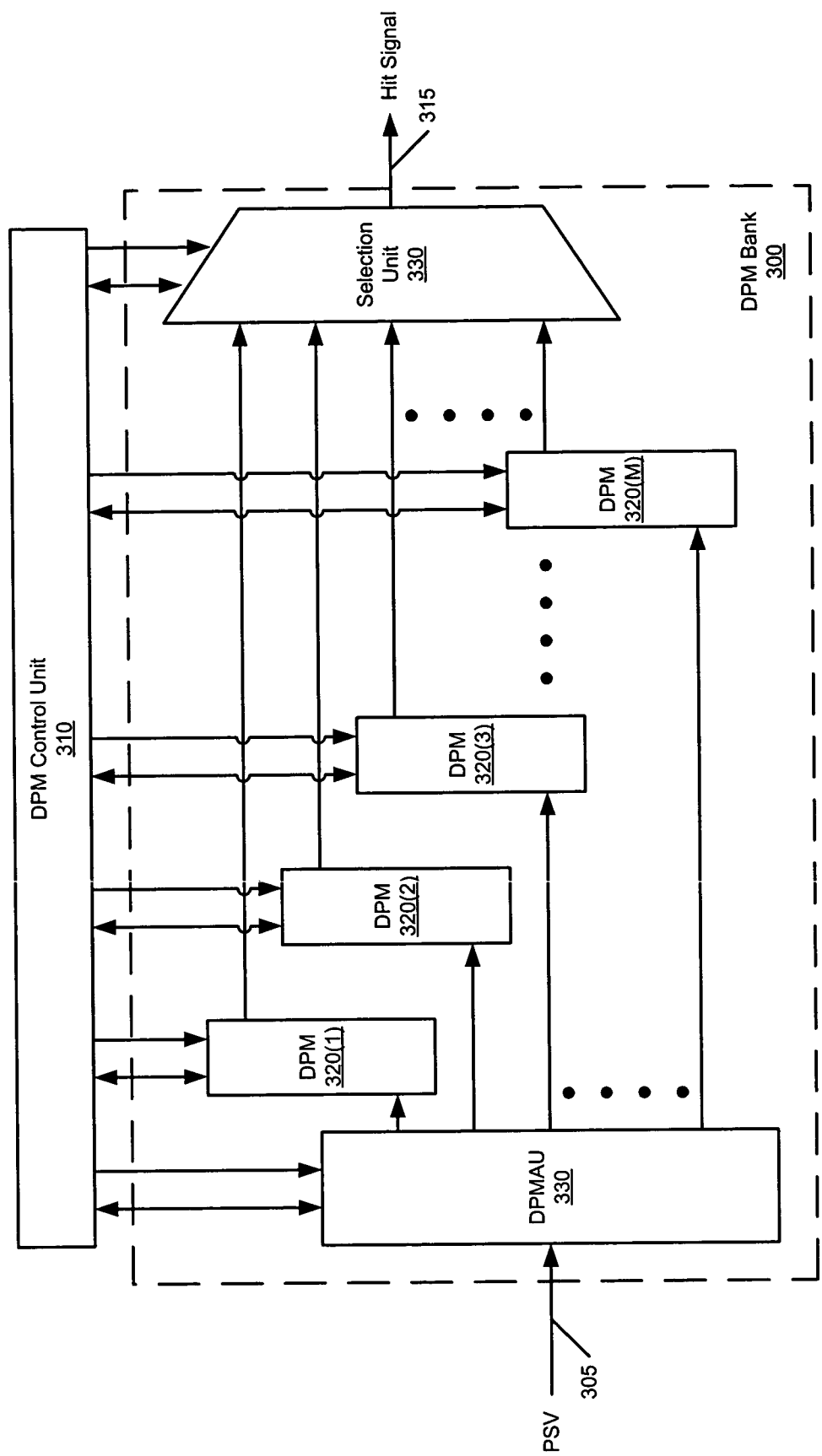
FIG. 3 is a block diagram illustrating a DPM bank with multiple DPMs according to embodiments of the present invention.

FIG. 3 is a block diagram illustrating a multi-bank technique according to the present invention. As in the case of DPM bank 200 of FIG. 2, a DPM bank 300 receives a PSV 305 and, under the control of a DPM control unit 310, generates a hit signal 315. Unlike DPM bank 200 of FIG. 2, however, DPM 300 supports a number of duplicate packet maps (depicted in FIG. 3 as DPMs 320(1)-(M)). In a similar manner, DPM bank 300 receives PSV 305 at a DPM addressing unit (DPMAU) 330, which is under the control of DPM control unit 310. DPMAU 330 is coupled to each of DPMs 320(1)-(M), and is configured to provide PSV 305 to selected ones thereof. It is in this aspect that DPM bank 300 differs from DPM bank 200. Whereas DPM bank 200 provides two duplicate packet maps (and can easily be configured to support only one duplicate packet map), DPM bank 300 is designed to support multiple (i.e., more than two) duplicate packet maps.

Under the control of DPM control unit 310, the outputs from appropriate ones of DPMs 320(1)-(M) are selected by a selection unit 330. Selection unit 330 provides a number of functions. Selection unit 330 selects the appropriate ones of DPMs 320(1)-(M) as the previous DPM and current DPM, ANDing together the selected fields from the given DPM, in order to determine whether the given DPM indicates a duplicate packet. Such a result from each of the selected DPMs is ORed with other such results, in order to determine if any of the selected DPMs indicates a duplicate packet. The result of this OR operation is output from DPM bank 300 as hit signal 315.

Figure 4:
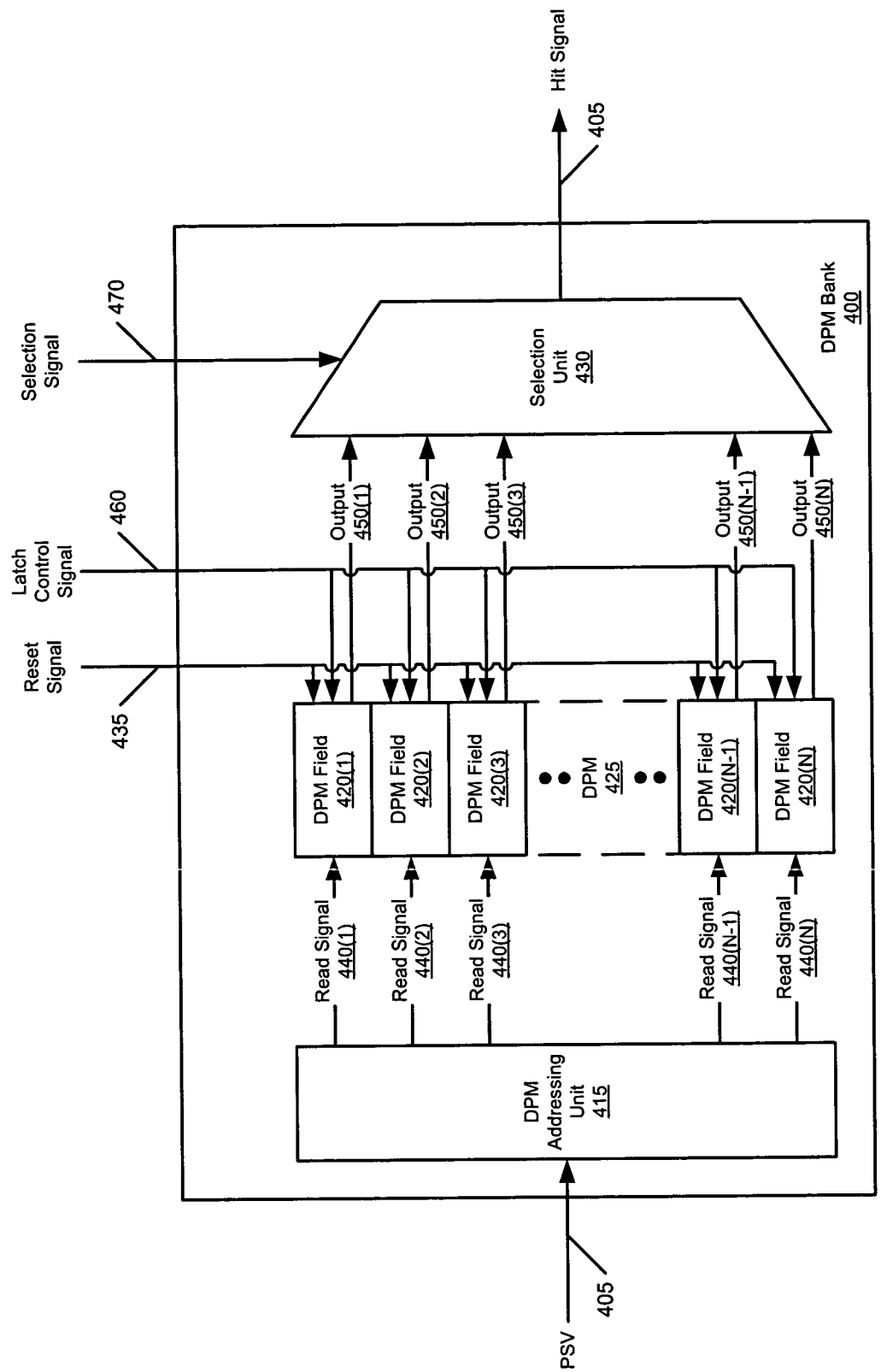
FIG. 4 is a block diagram illustrating a DPM according to embodiments of the present invention.

FIG. 4 is a block diagram illustrating in greater detail an example architecture for a duplicate packet map (DPM) bank 400. DPM bank 400 receives, in a manner similar to that previously discussed, a PSV 405, and in turn, generates a hit signal 410. In the architecture depicted in FIG. 4, DPM bank 400 includes a dedicated DPM addressing unit (depicted in FIG. 4 as a DPM addressing unit 415), a number of DPM fields (depicted as DPM fields 420(1)-(N), which make up a DPM 425), and a selection unit 430. Under the control of a DPM control unit (not shown), DPM bank 400 is designed to generate an indication of a duplicate packet via hit signal 410, based on the contents of one or more of DPM fields 420(1)-(N). It will be noted that, for the sake of simplicity, DPM bank 400 is depicted as having a single DPM (DPM 425, which is a single column of DPM fields). DPM 425 is cleared (e.g., reset to all 0's) by the assertion of a reset signal 435.

In operation, DPM bank 400 is initialized by the assertion of reset signal 435. Once initialized (and upon receipt of a packet and the subsequent generation of PSV 405), DPM addressing unit 415 receives the PSV to be "looked up" in DPM bank 400. DPM addressing unit 415 determines which of DPM fields 420(1)-(N) are to be read (e.g., which of those fields are expected to be ones in the case of a duplicate packet match, or, in the case of a Bloom Filter implementation, which one of DPM fields 420(1)-(N) is to be read). DPM addressing unit 415 accesses DPM fields 420(1)-(N) using a number of read signals (depicted as read signals 440(1)-(N)). In one implementation, DPM addressing unit 415 simply examines the value of PSV 405 and, for each bit position of that value that is equal to one, asserts a corresponding one of read signals for 440(1)-(N), thereby reading a corresponding one of DPM fields 420(1)-(N). Alternatively, in a Bloom Filter implementation, one of read signals for 440(1)-(N), corresponding to the value of PSV 405, is asserted. The output value is latched at a corresponding one of outputs 450(1)-(N) by a latch control signal 460. Selection unit 430 receives outputs 450(1)-(N), and selects the appropriate ones of these signals under the control of a selection signal 470 received from a DPM control unit (not shown). Thus identified, the appropriate ones of outputs 450(1)-(N) are selected and ANDed together, such that an affirmative result indicates that each of the corresponding ones of DPM fields 420(1)-(N) were likewise set, thus indicating a match (and so a duplicate packet). This result is provided to the packet processing unit as hit signal 410.

Figure 5:
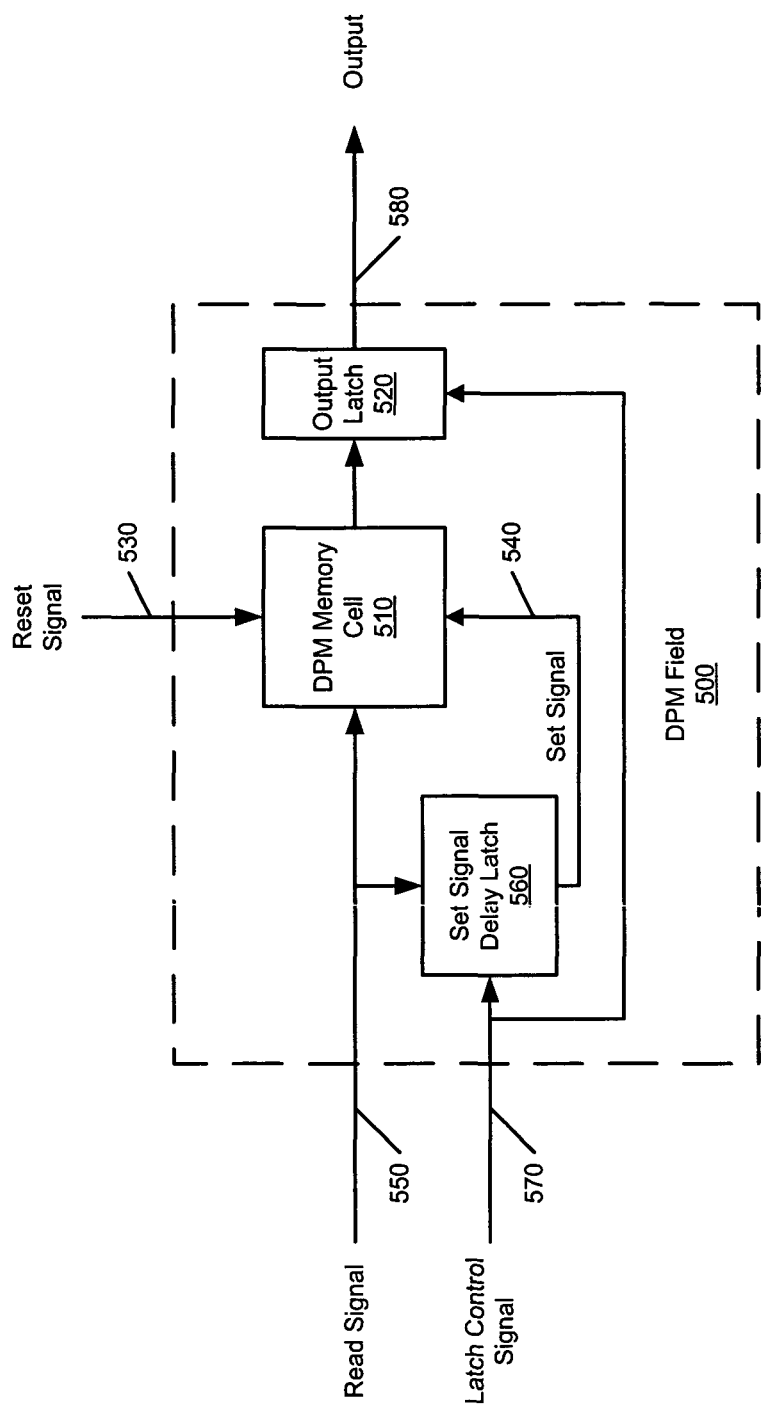
FIG. 5 is a block diagram illustrating a DPM field according to embodiments of the present invention.

FIG. 5 is block diagram of an example architecture of a DPM field 500, which is an example of DPM fields such as those discussed with regard to previous figures. DPM field 500 includes a DPM memory cell 510, whose output is latched by an output latch 520. DPM memory cell 510 also receives a reset signal 530 and set signal 540. Set signal 540 is a delayed version of a read signal 550, generated by delaying read signal 550 using a set signal delay latch 560, under the control of a latch control signal 570. Once the contents of DPM memory cell 510 have been latched by output latch 520, that value appears as an output 580.

In operation, DPM field 500 first receives reset signal 530, in order to initialize DPM memory cell 510. When DPM memory cell 510 is to be read, read signal 550 is asserted, thus causing the contents of DPM memory cell 510 to be presented to output latch 520. Latch control 570 is then asserted to latch this output and so present the output as output 580 of DPM field 500. In tandem with these operations, read signal 550 is presented to set signal delay latch 560, for ultimate presentation to DPM memory cell 510 as set signal 540. However, to avoid a race condition, read signal 550 is not asserted until latch control 570 is asserted to latch the output of DPM memory cell 510, and then only after the delay produced by set signal delay latch 560. Set signal 540 is thus asserted after this delay (i.e., after the assertion of read signal 550, the assertion of latch control signal 570 (and so the latching of the contents of DPM memory cell 510), and delay provided by set signal delay latch 560). The assertion of set signal 540 sets DPM memory cell 510. More simply put, DPM field 500 is designed such that it can be cleared, and then read. However, upon being read, DPM field 500 is then set, regardless of the contents of DPM memory cell 510. This continues to be the case, until the next time reset signal 530 is asserted.

In one embodiment, duplicate packet classification causes a packet to be dropped and, optionally, a counter to be incremented. In certain embodiments, the counter is selected by an aspect of packet classification, which might include, for example, conventional ACL classification. The duplicate packet classification should prevent statistics such as ACLs, policers and forwarding statistics from being updated in response to the duplicate. Network devices can be designed such that a packet classified as non-duplicate causes the suppression of the update to the DPM, in cases where the packet is dropped before transmission (e.g., by an output policer), if there is an indication that the duplicate might arrive later and not be dropped. However, care is required to preserve standard packet statistics, including the policer statistics. An example of such an ACL is now presented in connection with FIG. 6.

Figure 6:
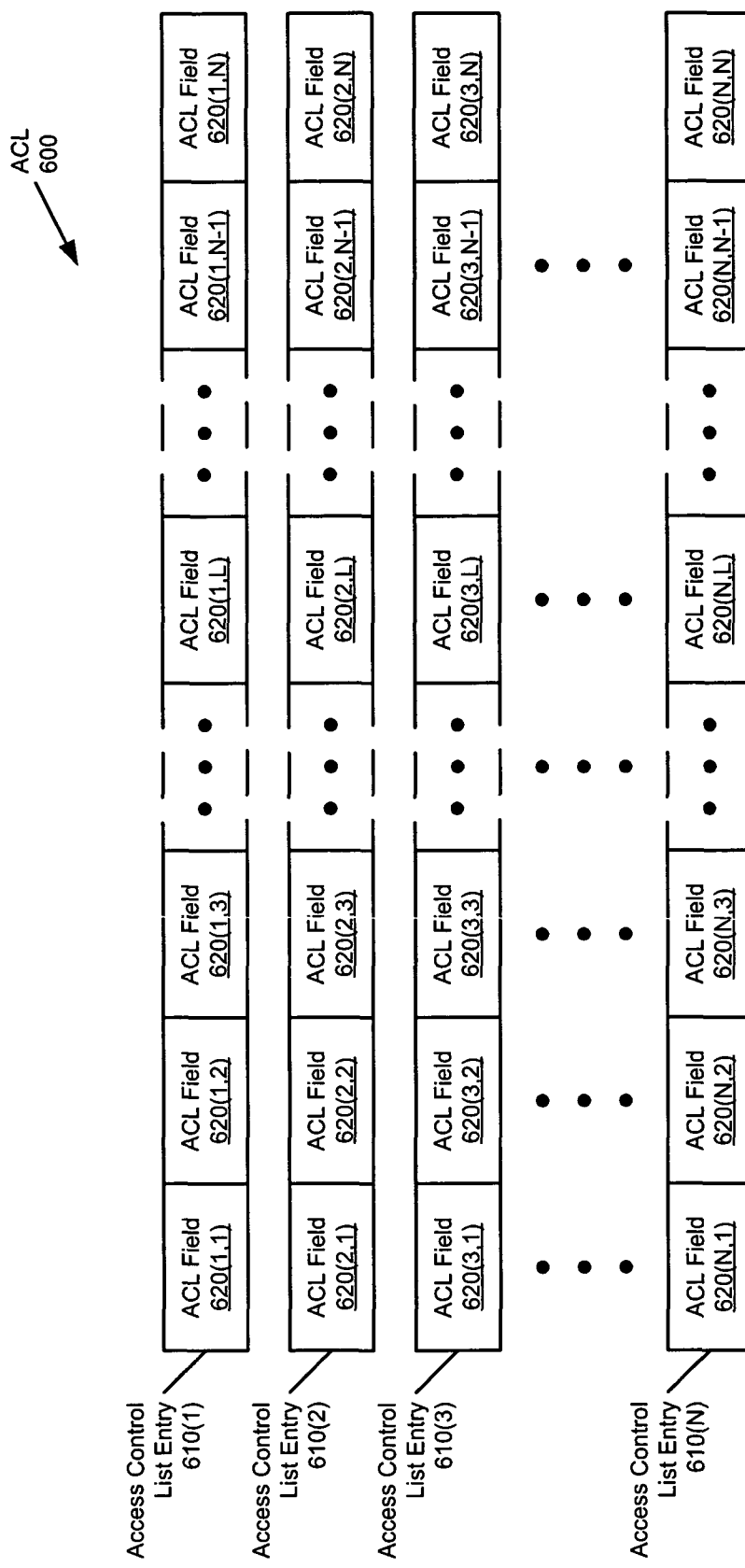
FIG. 6 is a block diagram illustrating an access control list that includes information supporting embodiments of the present invention.

FIG. 6 is a block diagram illustrating the fields of an access control list (ACL) 600. ACL 600 includes a number of access control list entries 610(1)-(N) (it will be noted that an access control list (ACL) entry can also be referred to as an ACE). Each of ACL entries 610(1)-(N) includes a number of fields, inclusively depicted in FIG. 6 as ACL fields 620(1,1)-(N,N). ACL 600 can be designed to take into account the results generated by a packet processing unit of the present invention. For example, ACL fields 620(1,L)-(N,L) can be configured to allow packet processing decisions to be based (at least in part) on the results of packet processing according to the present invention.

It should be noted that network-layer duplicate packet classification is not perfect, in the sense that it is possible for two different higher-level packets to be received with a two TIC time period and be mapped to the same PSV, causing the later one to be (mis)classified as a duplicate and (typically) dropped. While this is unfortunate, it only creates a problem if the resulting drop rate is a significant increase in the drop rate of the network layer from other factors. In fact, it can be argued that such a situation is really only a problem if such actions reduce the availability and reliability of the network for applications over a scheme with no duplicate packet transmission. The DPM should keep the number of "false positives" to a rate below acceptable packet drop with the associated packet arrival rates and TIC time interval. For instance, assuming a 10 Gbps connection and 300-byte average length packets, one could receive roughly 63,000 packets in a 15 millisecond interval.

In one embodiment, the network device implements a Bloom filter in place for each field of the DPM, as noted previously. Using a standard analysis of Bloom filters and assuming a good quality hash, designating a false hit tolerance of f and the number of packets received against the filter as P, the Bloom filter parameters are given as:

$$k=ceil(-\log_2(f)) n=ceil(\log_2(Pk))$$

where k is the number of subfields required in the PSV and n is the number of bits in each subfield, so n*k is the bit width of the PSV. Thus, with f as $10^{-6}$, for instance, k is roughly 20 and if P is roughly 128,000, n is roughly 2. This could be implemented as one bit array of $2^n$ bits, providing that the architecture supported k read-modify-write cycles per packet reception. However, one can implement this by providing a separate bit array subbank for each subfield, so each DPM bank requires 20 subbanks of roughly 2 megabits each, or 40 megabits total. With 3 fields per entry, a DPM bank is 120 Megabits. A DPM can be allocated per port or shared across multiple ports, modifying the parameters above as appropriate. For instance, a DPM shared by 4, 10 Gigabit ports would allow for 4 times the packet reception rate P. A specialized memory chip that provided a large number of (sub)banks of this nature would facilitate implementation in a high-speed hardware-based network device.

The methods of duplicate packet classification discussed herein are also subject to the situation in which a duplicate arrives sufficiently late so as to not be recognized as a duplicate by the DPM (in other words, more than 1-2 TICs after the original packet). This, however, is an unlikely event with suitable setting of the TIC interval. Moreover, most packet traffic is carried over TCP, and TCP can cause a duplicate packet to be received by retransmitting a packet in response to the absence of an acknowledgment of the original. Thus, the protocol (and in fact most protocols) can readily discard the duplicate packet at the host end in such a situation. Given this transport-level protection, duplicate packets slipping through occasionally does not cause any harm, so long as the amount of bandwidth and processing consumed at the receiving host is not significant. By requiring that the normal jitter between the two paths be significantly lower than the round-trip time (the usual case), the TIC interval can be set to make this a low probability event.

An Example Process for Duplicate Packet Detection

Figure 7:
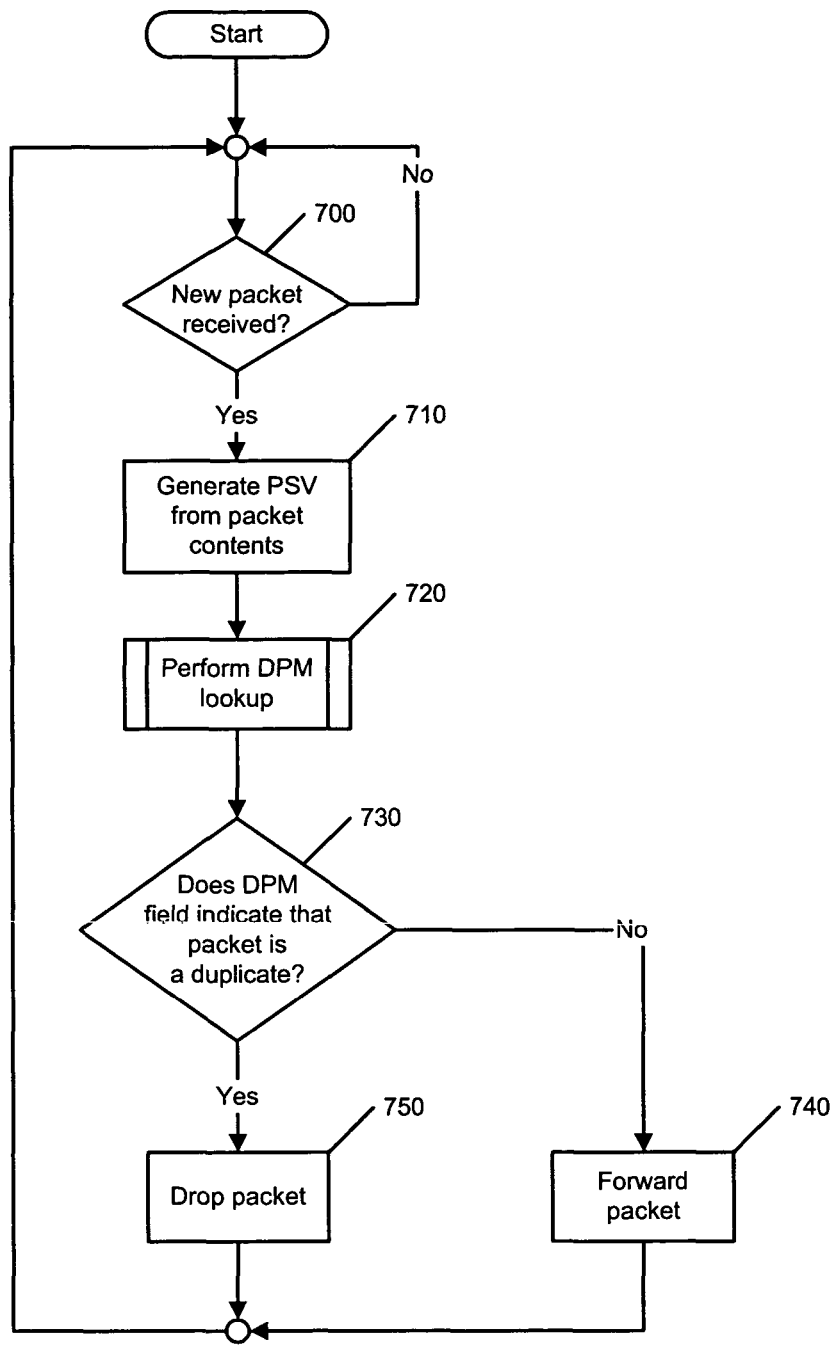
FIG. 7 is a flow diagram illustrating packet processing according to embodiments of the present invention.

FIG. 7 is flow diagram illustrating, generally, a process according to an embodiment of the present invention. The process begins with a determination as to the receipt of a new packet requiring such processing (step 700). So long as a new packet is not received, the process loops, awaiting the receipt of such a packet. Once a new packet is received, a packet summary value (PSV) is generated using, for example, the packet's contents (step 710). Once the packet's PSV is generated, that PSV is used to perform a duplicate packet map lookup (step 720). Next, a determination is made as to whether the DPM fields corresponding to the value of the PSV indicates that the packet in question is a duplicate (730). If the packet is not a duplicate, the packet is forwarded in the usual manner (e.g., according the applicable ACE's for that packet) (step 740). However, if the DPM fields for that packet's PSV indicate that the packet is a duplicate, the packet is dropped (step 750).

As noted, FIG. 7 depicts a flow diagram illustrating a process according to an embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the processes depicted and discussed herein may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes as executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, and the like. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 8:
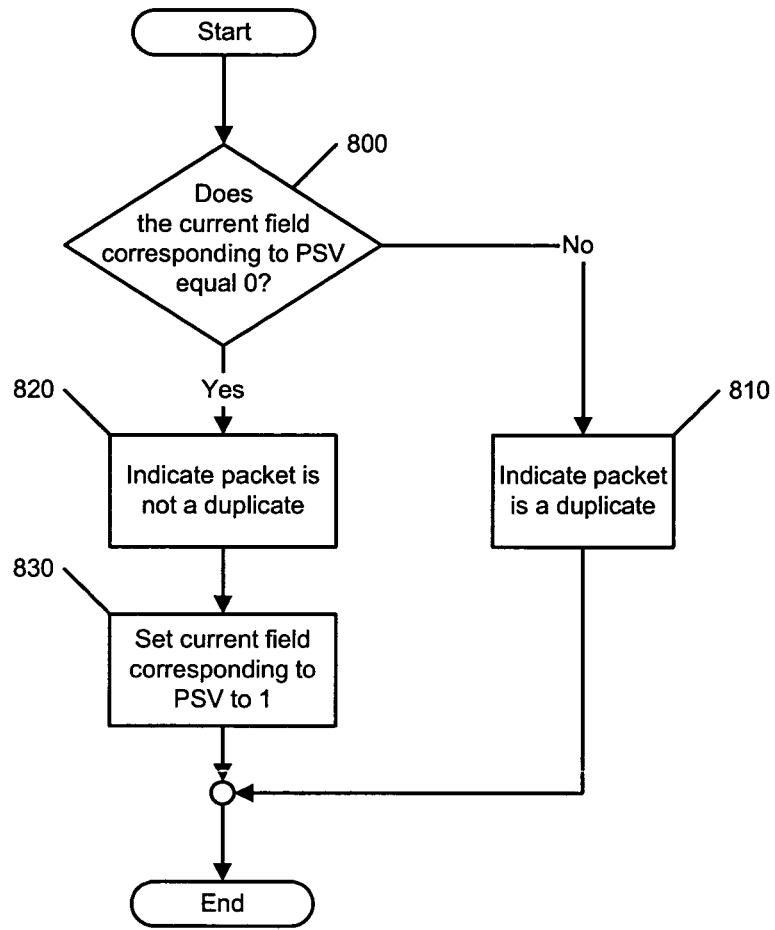
FIG. 8 is a flow diagram illustrating a process of DPM lookup according to embodiments of the present invention.

FIG. 8 is a flow diagram illustrating a basic process of DPM look up (such as that depicted in FIG. 7) in an architecture such as that depicted in FIG. 2. The process begins with a determination as to whether the current field corresponding to the PSV is equal to zero (e.g., cleared) (step 800). As will be apparent, the determination as to whether the current field corresponding to the PSV is equal to zero can be taken to represent either the analysis using a single duplicate packet map, or the OR'ing together of the results from two duplicate packet maps (in the case where a windowed approach is used). In any case, if this analysis indicates that the current field corresponding to the PSV is not equal to zero, the DPM bank indicates that the packet in question is a duplicate (step 810). However, if the current field corresponding to the PSV is equal to zero, the DPM bank indicates that the packet in question is not a duplicate (step 820) and sets the current field corresponding to the given packet's PSV (e.g., to one) (step 830).

Figure 9:
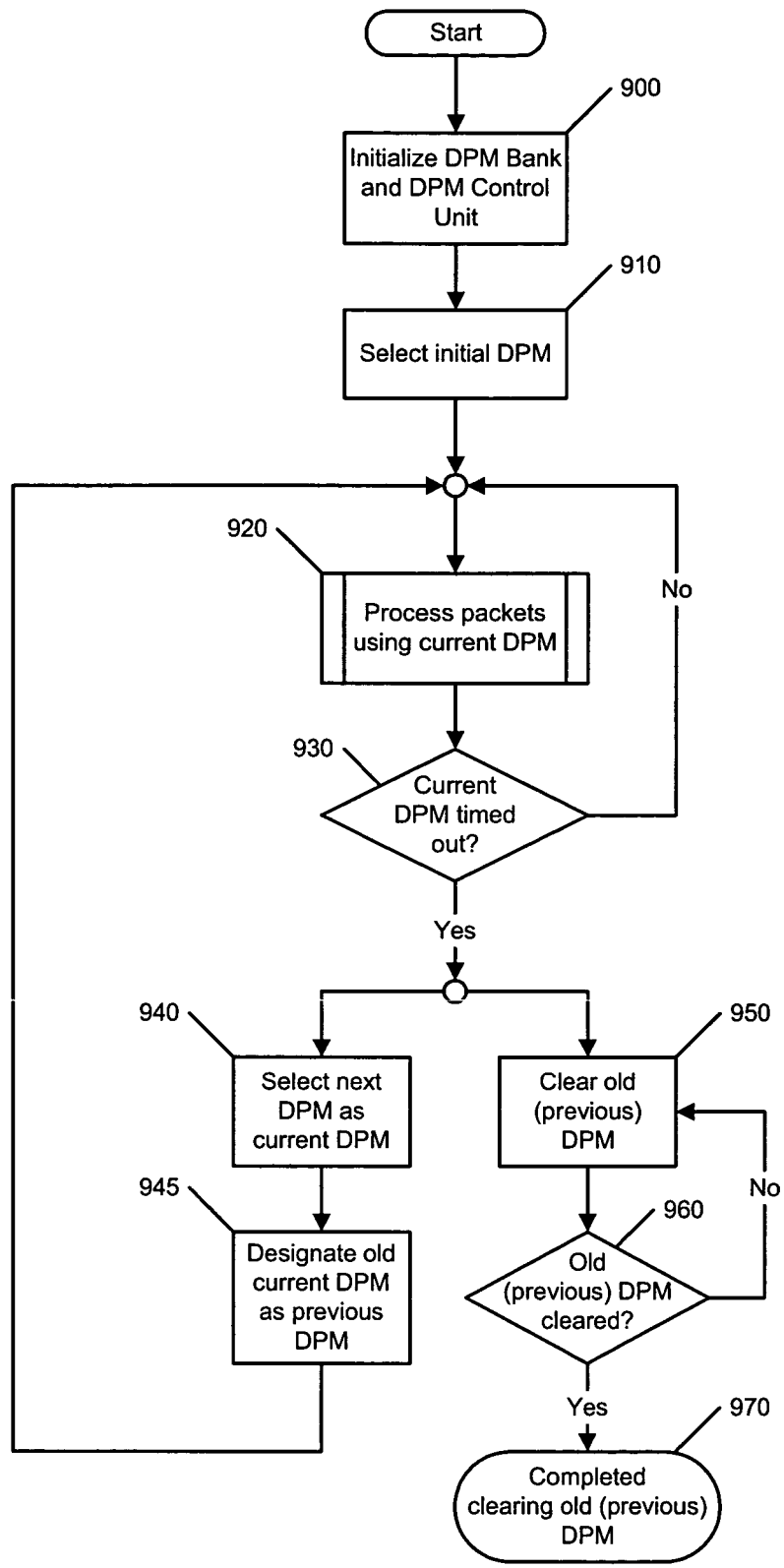
FIG. 9 is a flow diagram illustrating a process for operating a DPM bank that includes multiple DPMs, according to embodiments of the present invention.

FIG. 9 is a flow diagram illustrating a process for operating a DPM bank such as DPM bank 300 of FIG. 3. The processing begins with the initialization of the DPM bank and the DPM control unit (step 900). Next, the DPMs that initially serve as the previous and current DPMs are selected (step 910). Once the previous and current DPMs are selected, the processing of packets using those DPMS can then begin (step 920). This continues until the DPM that has been identified as the current DPM times out (as indicated by the DPM control unit) (step 930). Once the current DPM times out, the next DPM becomes the current DPM (step 940), and the "old" current DPM becomes the previous DPM (step 945).

In certain embodiments, while the current and next DPMs are selected for their new positions, the DPM that had been selected as the previous DPM can be cleared. In such implementations, it is desirable to take the old (previous) DPM out of service in order to clear that DPM. In that case, a separate sub-process for clearing the old DPM can be employed. While the current and the next DPMs are being selected as the "new" previous and current DPMs (step 940), the "old" previous DPM is cleared (step 950). This process proceeds while the old (previous) DPM not completely cleared (step 960), and continues until the old (previous) DPM has been completely cleared (step 970). At this point, the DPM is available for use as a current DPM.

Figure 10:
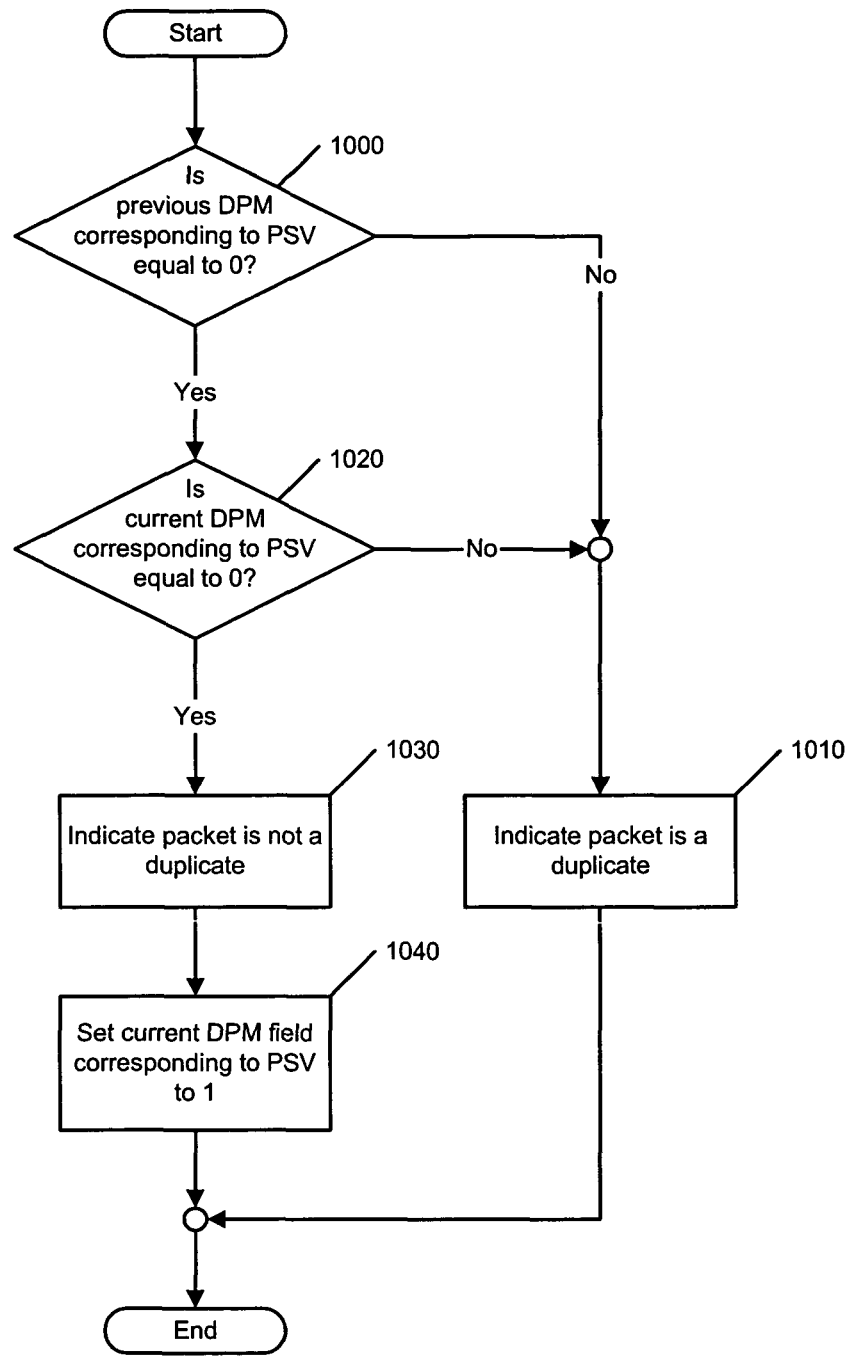
FIG. 10 is a flow diagram illustrating a process of DPM lookup using previous and current DPM banks according to embodiments of the present invention.

FIG. 10 is flow diagram illustrating a process according to the present invention for processing packets using a current and a previous DPM in a manner suggested in FIG. 9. The process begins by determining whether the previous DPM corresponding to the current PSV value is equal to zero (step 1000). If the previous DPM corresponding to the present PSV value is not equal to zero, the DPM bank indicates that the given packet is a duplicate (step 1010).

However, if the previous DPM corresponding to the current PSV value is equal to zero, a determination is made as to whether the current DPM corresponding to the current PSV value is equal to zero (step 1020). Again, as with a previous DPM that is not equal to zero, if the current DPM corresponding to the current PSV value is not equal to zero, the DPM bank indicates that the given packet is a duplicate (step 1010). If, however, the current DPM corresponding to the current PSV value is also equal to zero, the DPM bank indicates that the given packet is not a duplicate (step 1030). Additionally, the DPM bank sets the current DPM corresponding to the current PSV value (e.g., to ones) to indicate that a packet with a PSV value corresponding to the current PSV value has been identified by the DPM bank (step 1040).

The basic scheme described herein can be extended in a variety of ways. For instance, the duplicate classification can be limited to a selected subset of packets arriving across links for which duplicate transmission is being used, and to a subset of protocols, such as TCP, that are resilient to the occasional duplicate packet. Conversely, duplicate packet classification can be used to determine and respond to the incidence of duplicates occurring in a network setting in which duplicates are not expected. For example, the duplicate packet classification can be used to suppress duplicates that might arise from the failure of a network device (e.g., a router failure, where such a failed router repeatedly sends the same packets), a spanning tree loop, a multicast loop or even a malicious attack where a large number of duplicate packets are being generated.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A network device comprising:
   a duplicate packet map (DPM), wherein
      said DPM comprises
         a first DPM field comprising a first plurality of bit entries, and
         a second DPM field comprising a second plurality of bit entries,
      said first DPM field is designated as a previous time interval field,
      said second DPM field is designated as a current time interval field,
      said previous time interval field corresponds to a previous time interval,
      said current time interval field corresponds to a current time interval,
      said previous time interval occurs before said current time interval,
      said previous time interval is substantially equal in duration to said current time interval, and
      said previous time interval is distinct from said current time interval;
   a packet summary value (PSV) generator, wherein
      said DPM is coupled to said PSV generator,
      said PSV generator is configured to, responsive to receiving a packet,
         extract data from said packet, and
         calculate a PSV using said data from said packet by virtue of being configured to
            generate hashed data by hashing said data from said packet using a hashing function, wherein
               said PSV corresponds to said hashed data, and
      said DPM is configured to receive said PSV; and
   a DPM bank, wherein
      said DPM bank is configured to store a plurality of DPMs,
      said plurality of DPMs comprises said DPM, and
      said DPM bank further comprises
         a DPM addressing unit coupled to said DPMs,
         a selection unit coupled to said DPMs, and
         a DPM control unit, coupled to control said DPM addressing unit, said DPMs and said selection unit.

2. The network device of claim 1, wherein said DPM is implemented as a Bloom filter.

3. The network device of claim 1, wherein
   a bit entry of each said first and second DPM fields corresponds to said PSV.

4. The network device of claim 1, wherein
   said PSV comprises a third plurality of bit entries, and
   each bit entry of said first and second DPM fields corresponds to a bit in said third plurality of bit entries of said PSV.

5. The network device of claim 1, wherein
   said PSV comprises a third plurality of bit entries,
   each bit entry of said first plurality of bit entries and each bit entry of said second plurality of bit entries correspond to a bit entry of said third plurality of bit entries of said PSV,
   said first DPM field is configured to compare a value of a bit entry of said third plurality of bit entries of said PSV with a value of a corresponding bit entry of said first plurality of bit entries to generate an output,
   said second DPM field is configured to compare a value of a bit entry of said third plurality of bit entries of said PSV with a value of a corresponding bit entry of said second plurality of bit entries to generate an output, and
   a value of each of said outputs indicates whether said value of said bit entry of said third plurality of bit entries of said PSV matches said values of said corresponding bit entries of each of said first plurality of bit entries and said second plurality of bit entries.

6. The network device of claim 1, wherein
   said PSV comprises a third plurality of bit entries,
   each of said first and second DPM fields is configured to be addressed using said PSV,
   each bit entry of said first plurality of bit entries and each bit entry of said second plurality of bit entries is configured to be selected using said third plurality of bit entries of said PSV as an address,
   a value of said bit entry of said first plurality of bit entries and a value of said bit entry of said second plurality of bit entries correspond to said PSV, and
   said value of said bit entry of said first plurality of bit entries and said value of said bit entry of said second plurality of bit entries indicates whether said packet is said duplicate packet.

7. The network device of claim 1, wherein
   said PSV generator is configured to calculate said PSV using a cyclic redundancy check (CRC) calculation; and
   said data from said packet is path-independent.

8. The network device of claim 7, wherein
   the data from said packet excludes header and trailer information.

9. The network device of claim 7, wherein
   said PSV generator is configured to generate a PSV based on a packet received by said PSV generator, and
   said DPM is configured to receive said PSV.

10. The network device of claim 9, wherein
    said DPM is further configured to indicate that said PSV matches a PSV stored in said DPM.

11. The network device of claim 10, wherein said PSV generator is configured to generate said PSV using a cyclic redundancy check computation.

12. The network device of claim 7, further comprising:
    a packet processing unit, said packet processing unit comprising said PSV generator.

13. The network device of claim 12, wherein
    said DPM bank is configured to generate a hit signal, and
    said DPM bank is coupled to receive said PSV from said PSV generator and to provide said hit signal to said packet processing unit.

14. The network device of claim 13, wherein
said hit signal indicates that a value of said PSV matches a value stored in a one of said DPMs.
15. The network device of claim 13, wherein
said hit signal indicates that bit values of said PSV match bit values stored in corresponding locations in a one of said DPMs.
16. The network device of claim 13, wherein
said packet processing unit is configured to process said packet using said hit signal.
17. The network device of claim 13, wherein
said processing includes causing said packet processing unit to drop said packet based on said hit signal.
18. The network device of claim 1, wherein
each of said DPMs is implemented as a Bloom filter.
19. The network device of claim 1, wherein
said DPM control unit is configured to select a first one of said DPMs as a current DPM and a second one of said DPMs as a previous DPM.
20. The network device of claim 19, wherein
said DPM control unit is configured to cause said DPM addressing unit to provide said PSV to said current DPM and said previous DPM; and
said DPM control unit is configured to cause said selection unit to select said current DPM and said previous DPM.
21. The network device of claim 19, wherein
said DPM control unit is configured to select said previous DPM as an inactive DPM and to clear said inactive DPM.
22. The network device of claim 1, further comprising:
said packet summary value (PSV) generator
is coupled to each of said DPMs.
23. The network device of claim 22, wherein
said DPM addressing unit is coupled between said PSV generator and said DPMs.
24. The network device of claim 23, wherein
said selection unit is configured to generate a hit signal, and
said hit signal indicates that bit values of said PSV match bit values stored in corresponding locations in a one of said DPMs.
25. A method comprising:
causing a packet summary value (PSV) generator to generate a PSV, wherein
said generating said PSV comprises, responsive to receiving a packet,
extracting data from said packet, and
calculating said PSV using said data from said packet by virtue of being configured to
generate hashed data by hashing said data from said packet using a hashing function, wherein
said PSV corresponds to said hashed data;
determining if a field of a duplicate packet map (DPM) indicates said packet is a duplicate packet, wherein
said DPM is one of a plurality of DPMs included in a DPM bank,
said determining uses said PSV,
said PSV corresponds to said packet by virtue of said PSV corresponding to said hashed data,
said DPM comprises
a first DPM field comprising a first plurality of bit entries, and
a second DPM field comprising a second plurality of bit entries,
said PSV comprises a third plurality of bit entries,
said first DPM field is designated as a previous time interval field,
said second DPM field is designated as a current time interval field,
said previous time interval field corresponds to a previous time interval,
said current time interval field corresponds to a current time interval,
said previous time interval occurs before said current time interval,
said previous time interval is substantially equal in duration to said current time interval,
said previous time interval is distinct from said current time interval,
each bit entry of said first plurality of bit entries and each bit entry of said second plurality of bit entries correspond to a bit entry of said third plurality of bit entries of said PSV, and
said determining comprises
comparing said PSV to said first DPM field by comparing a value of a bit entry of said third plurality of bit entries of said PSV with a value of a corresponding bit entry of said first plurality of bit entries, and
comparing said PSV to said second DPM field by comparing said value of said bit entry of said third plurality of bit entries of said PSV with a value of a corresponding bit entry of said second plurality of bit entries; and
indicating said packet is said duplicate packet, wherein
said indicating is performed if said value of said bit entry of said third plurality of bit entries of said PSV matches
said value of said corresponding bit entry of said first plurality of bit entries, and
said value of said corresponding bit entry of said second plurality of bit entries.
26. The method of claim 25, further comprising:
dropping said packet, if said packet is said duplicate packet.
27. The method of claim 25, further comprising:
setting said value of said corresponding bit entry of said first plurality of bit entries to said value of said bit entry of said third plurality of bit entries of said PSV.
28. The method of claim 25, wherein said determining comprises:
selecting a bit entry of said first DPM field based on said PSV, and
selecting a bit entry of said second DPM field based on said PSV.
29. The method of claim 25, wherein
each bit entry of said first plurality of bit entries and each bit entry of said second plurality of bit entries is configured to be addressed using said third plurality of bit entries of said PSV, wherein
a value of said bit entry of said first plurality of bit entries and a value of said bit entry of said second plurality of bit entries correspond to said PSV,
said determining comprises
selecting a corresponding bit entry of said first plurality of bit entries using said third plurality of bit entries of said PSV as an address, and
selecting a corresponding bit entry of said second plurality of bit entries using said third plurality of bit entries of said PSV as an address, and
said indicating is performed if said value of said bit entry of said first plurality of bit entries and said value of said bit entry of said second plurality of bit entries indicates that said packet is said duplicate packet.

30. The method of claim 29, further comprising:
setting said value of said corresponding bit entry of said first plurality of bit entries, if said packet is not said duplicate packet.

31. The method of claim 30, further comprising:
said generating said PSV further comprises calculating a cyclic redundancy check value based on said data in said packet, wherein
said data from said packet excludes header and trailer information, and
said data from said packet is path-independent.

32. The method of claim 25, further comprising:
selecting a first DPM of said plurality of DPMs as a previous DPM; and
selecting a second DPM of said plurality of DPMs as a current DPM.

33. The method of claim 32, further comprising:
determining if a field of said previous DPM indicates said packet is said duplicate packet, using said PSV; and
determining if a field of said current DPM indicates said packet is said duplicate packet, using said PSV.

34. The method of claim 33, further comprising:
indicating said packet is not said duplicate packet, if said field of said previous DPM indicates said packet is not said duplicate packet and said field of said current DPM indicates said packet is not said duplicate packet, and
indicating said packet is said duplicate packet, otherwise.

35. The method of claim 32, further comprising:
selecting said previous DPM as an inactive DPM;
selecting said current DPM as said previous DPM; and
selecting another DPM of said DPMs as said current DPM.

36. The method of claim 35, further comprising:
clearing said inactive DPM prior to said inactive DPM being selected as said current DPM.

37. The method of claim 35, wherein
said selecting said previous DPM as said inactive DPM, said selecting said current DPM as said previous DPM, and said selecting said another DPM of said DPMs as said current DPM are performed periodically.

38. The method of claim 37, wherein
a period of said performing periodically is such that said period is greater than an expected differential between duplicate packet arrivals and said period is less than a time between packet retransmissions.

39. The method of claim 37, wherein
a period of said performing periodically is configured to allow said inactive DPM to be cleared prior to said inactive DPM being selected as said current DPM.

40. A network device comprising:
a processor;
a computer readable medium coupled to said processor; and
computer code, encoded in said computer readable medium configured to cause said processor to:
generate a packet summary value (PSV), wherein
said computer code configured to cause said processor to generate said PSV comprises computer code configured to cause said processor to, responsive to receiving a packet,
extract data from said packet, and
calculate said PSV using said data from said packet by virtue of being configured to
generate hashed data by hashing said data from said packet using a hashing function, wherein
said PSV corresponds to said hashed data, determine if a field of a duplicate packet map (DPM) indicates said packet is a duplicate packet, wherein
said DPM is one of a plurality of DPMs included in a DPM bank,
said computer code configured to cause said processor to determine uses said PSV,
said PSV corresponds to said packet by virtue of said PSV corresponding to said hashed data, and
said DPM comprises
a first DPM field comprising a first plurality of bit entries, and
a second DPM field comprising a second plurality of bit entries,
said PSV comprises a third plurality of bit entries,
said first DPM field is designated as a previous time interval field,
said second DPM field is designated as a current time interval field,
said previous time interval field corresponds to a previous time interval,
said current time interval field corresponds to a current time interval,
said previous time interval occurs before said current time interval,
said previous time interval is substantially equal in duration to said current time interval,
said previous time interval is distinct from said current time interval,
each bit entry of said first plurality of bit entries and each bit entry of said second plurality of bit entries correspond to a bit entry of said third plurality of bit entries of said PSV, and
said computer code configured to cause said processor to determine comprises computer code further configured to cause said processor to
compare a value of a bit entry of said third plurality of bit entries of said PSV with a value of a corresponding bit entry of said first plurality of bit entries, and
compare said value of said bit entry of said third plurality of bit entries of said PSV with a value of a corresponding bit entry of said second plurality of bit entries, and
indicate said packet is said duplicate packet, if said value of said bit entry of said third plurality of bit entries of said PSV matches
said value of said corresponding bit entry of said first plurality of bit entries, and
said value of said corresponding bit entry of said second plurality of bit entries.

41. The network device of claim 40, wherein said computer code is further configured to cause said processor to indicate said packet is said duplicate packet is configured to indicate said packet is said duplicate packet if said computer code configured to cause said processor to determine determines said packet is said duplicate packet.

42. The network device of claim 41, wherein said computer code is further configured to cause said processor to:
compare said PSV to said first DPM field, and
compare said PSV to said second DPM field.

43. The network device of claim 41, wherein said computer code is further configured to cause said processor to:
select a bit entry of said first DPM field based on said PSV, and
select a bit entry of said second DPM field based on said PSV.

44. The network device of claim 43, wherein said computer code is further configured to cause said processor to:
   generate said PSV by virtue of being configured to calculate a cyclic redundancy check value based on said data in said packet, wherein
      said data from said packet excludes header and trailer information, and
      said data from said packet is path-independent.

45. The network device of claim 40, wherein said computer code is further configured to cause said processor to:
   select a first DPM of said DPMs as a previous DPM; and
   select a second DPM of said DPMs as a current DPM.

46. The network device of claim 45, wherein said computer code is further configured to cause said processor to:
   determine if a field of said previous DPM indicates said packet is said duplicate packet, using said PSV; and
   determine if a field of said current DPM indicates said packet is said duplicate packet, using said PSV.

47. The network device of claim 46, wherein said computer code is further configured to cause said processor to:
   indicate said packet is not said duplicate packet, if said field of said previous DPM indicates said packet is not said duplicate packet and said field of said current DPM indicates said packet is not said duplicate packet, and
   indicate said packet is said duplicate packet, otherwise.

48. The network device of claim 45, wherein said computer code is further configured to cause said processor to:
   select said previous DPM as an inactive DPM;
   select said current DPM as said previous DPM; and
   select another DPM of said DPMs as said current DPM.

49. The network device of claim 48, wherein
   said computer code further configured to cause said processor to select said previous DPM as said inactive DPM, said computer code further configured to cause said processor to select said current DPM as said previous DPM, and said computer code further configured to cause said processor to select said another DPM of said DPMs as said current DPM are further configured to be performed periodically.

50. The network device of claim 49, wherein
   a period of said performing periodically is such that said period is greater than an expected differential between duplicate packet arrivals and said period is less than a time between packet retransmissions.

51. The network device of claim 49, wherein
   a period of said performing periodically is configured to allow said inactive DPM to be cleared prior to said inactive DPM being selected as said current DPM.

52. A non-transitory computer-readable storage medium comprising program instructions executable on a processor, the computer-readable storage medium encoding the program instructions, wherein the program instructions comprise:
   a first set of instructions configured to determine if a field of a duplicate packet map (DPM) indicates a packet is a duplicate packet, wherein
      said DPM is one of a plurality of DPMs included in a DPM bank,
      said first set of instructions is configured to determine if said field of said duplicate packet map indicates said packet is said duplicate packet using a packet summary value (PSV) corresponding to said packet, and
      said DPM comprises
         a first DPM field comprising a first plurality of bit entries, and
         a second DPM field comprising a second plurality of bit entries,
      said PSV comprises a third plurality of bit entries,
      said first DPM field is designated as a previous time interval field,
      said second DPM field is designated as a current time interval field,
      said previous time interval field corresponds to a previous time interval,
      said current time interval field corresponds to a current time interval,
      said previous time interval occurs before said current time interval,
      said previous time interval is substantially equal in duration to said current time interval,
      said previous time interval is distinct from said current time interval,
      each bit entry of said first plurality of bit entries and each bit entry of said second plurality of bit entries correspond to a bit entry of said third plurality of bit entries of said PSV, and
      said first set of instructions comprises
         a first subset of instructions configured to compare a value of a bit entry of said third plurality of bit entries of said PSV with a value of a corresponding bit entry of said first plurality of bit entries, and
         a second subset of instructions configured to compare said value of said bit entry of said third plurality of bit entries of said PSV with a value of a corresponding bit entry of said second plurality of bit entries;
   a second set of instructions configured to generate said packet summary value (PSV), wherein
      said second set of instructions comprises instructions configured to cause said processor to, responsive to receiving said packet,
         extract data from said packet, and
         calculate said PSV using said data from said packet by virtue of being configured to
            generate hashed data by hashing said data from said packet using a hashing function, wherein
               said PSV corresponds to said hashed data; and
   a third set of instructions configured to indicate said packet is said duplicate packet, if said value of said bit entry of said third plurality of bit entries of said PSV matches
      said value of said corresponding bit entry of said first plurality of bit entries, and
      said value of said corresponding bit entry of said second plurality of bit entries.

53. The program instructions of claim 52, further comprising:
   a fourth set of instructions configured to indicate said packet is said duplicate packet, if said first set of instructions configured to cause said processor to determine determines said packet is said duplicate packet.

54. The program instructions of claim 53, further comprising:
   a fifth set of instructions configured to compare said PSV to said first DPM field, and
   compare said PSV to said second DPM field.

55. The program instructions of claim 53, further comprising:
   a fifth set of instructions configured to select a bit entry of said first DPM field based on said PSV, and
   select a bit entry of said second DPM field based on said PSV.

56. The program instructions of claim 55, further comprising:
a sixth set of instructions configured to generate said PSV by virtue of being configured to calculate a cyclic redundancy check value based on said data in said packet, wherein
said data from said packet excludes header and trailer information, and
said data from said packet is path-independent.

57. The program instructions of claim 52, further comprising:
a fourth set of instructions configured to select a first DPM of said DPMs as a previous DPM; and
a fifth set of instructions configured to select a second DPM of said DPMs as a current DPM.

58. The program instructions of claim 57, further comprising:
a sixth set of instructions configured to determine if a field of said previous DPM indicates said packet is said duplicate packet, using said PSV; and
a seventh set of instructions configured to determine if a field of said current DPM indicates said packet is said duplicate packet, using said PSV.

59. The program instructions of claim 58, further comprising:
an eighth set of instructions configured to indicate said packet is not said duplicate packet, if said field of said previous DPM indicates said packet is not said duplicate packet and said field of said current DPM indicates said packet is not said duplicate packet, and
a ninth set of instructions configured to indicate said packet is said duplicate packet, otherwise.

60. The program instructions of claim 57, further comprising:
a sixth set of instructions configured to select said previous DPM as an inactive DPM;
a seventh set of instructions configured to select said current DPM as said previous DPM; and
an eighth set of instructions configured to select another DPM of said DPMs as said current DPM.

61. The program instructions of claim 60, wherein said sixth, said seventh, and said eighth set of instructions are performed periodically.

62. The program instructions of claim 61, wherein a period of said performing periodically is such that said period is greater than an expected differential between duplicate packet arrivals and said period is less than a time between packet retransmissions.

63. The program instructions of claim 61, wherein a period of said performing periodically is configured to allow said inactive DPM to be cleared prior to said inactive DPM being selected as said current DPM.

64. An apparatus comprising:
means for generating a packet summary value (PSV), wherein
said means for generating said PSV comprises means for, responsive to receiving a packet,
extracting data from said packet, and
calculating said PSV using said data from said packet, wherein
said means for calculating said PSV comprises
means for generating hashed data by hashing said data from said packet using a hashing function, and
said PSV corresponds to said hashed data; and
means for determining if a field of a duplicate packet map (DPM) indicates a packet is a duplicate packet, wherein
said DPM is one of a plurality of DPMs included in a DPM bank,
said means for determining uses said PSV,
said PSV corresponds to said packet by virtue of said PSV corresponding to said hashed data, said DPM comprises
a first DPM field comprising a first plurality of bit entries, and
a second DPM field comprising a second plurality of bit entries,
said first DPM field is designated as a previous time interval field,
said second DPM field is designated as a current time interval field,
said previous time interval field corresponds to a previous time interval,
said current time interval field corresponds to a current time interval,
said previous time interval occurs before said current time interval, and
said previous time interval is distinct from said current time interval;
means for indicating said packet is said duplicate packet, wherein
said means for indicating is configured to indicate said packet is said duplicate packet if said means for determining determines said packet is said duplicate packet, and
said means for indicating comprises
a DPM addressing unit coupled to said DPMs,
a selection unit coupled to said DPMs, and
a DPM control unit, coupled to control said DPM addressing unit,
said DPMs, and said selection unit; and
means for selecting said field of said DPM based on said PSV.

65. The apparatus of claim 64, wherein said means for determining comprises:
means for comparing said PSV to said DPM.

66. The apparatus of claim 64, wherein:
said means for generating said PSV further comprises means for calculating a cyclic redundancy check value based on said data in said packet, wherein
the data from said packet excludes header and trailer information, and
the data from said packet is path-independent.

67. The apparatus of claim 64, further comprising:
means for selecting a first DPM of said DPMs as a previous DPM; and
means for selecting a second DPM of said DPMs as a current DPM.

68. The apparatus of claim 67, further comprising:
means for determining if a field of said previous DPM indicates said packet is said duplicate packet, using said PSV; and
means for determining if a field of said current DPM indicates said packet is said duplicate packet, using said PSV.

69. The apparatus of claim 68, further comprising:
means for indicating said packet is not said duplicate packet, if said field of said previous DPM indicates said packet is not said duplicate packet and said field of said current DPM indicates said packet is not said duplicate packet, and
means for indicating said packet is said duplicate packet, otherwise.

70. The apparatus of claim 67, further comprising:
means for selecting said previous DPM as an inactive DPM;
means for selecting said current DPM as said previous DPM; and
means for selecting another DPM of said DPMs as said current DPM.

71. The apparatus of claim 70, further comprising:
means for clearing said inactive DPM prior to said inactive DPM being selected as said current DPM.

72. The apparatus of claim 70, wherein
said means for selecting said previous DPM as said inactive DPM, said means for selecting said current DPM as said previous DPM, and said means for selecting said another DPM of said DPMs as said current DPM perform their respective selections periodically.

73. A method of claim 25, comprising:
causing a packet summary value (PSV) generator to generate a PSV, wherein
said generating said PSV comprises, responsive to receiving a packet, extracting data from said packet, and
calculating said PSV using said data from said packet by virtue of being configured to
generate hashed data by hashing said data from said packet using a hashing function, wherein said PSV corresponds to said hashed data;
determining if a field of a duplicate packet map (DPM) indicates said packet is a duplicate packet, wherein
said DPM is one of a plurality of DPMs included in a DPM bank,
said determining uses said PSV,
said PSV corresponds to said packet by virtue of said PSV corresponding to said hashed data,
said DPM comprises
a first DPM field comprising a first plurality of bit entries, and
a second DPM field comprising a second plurality of bit entries,
said first DPM field is designated as a previous time interval field,
said second DPM field is designated as a current time interval field,
said previous time interval field corresponds to a previous time interval,
said current time interval field corresponds to a current time interval,
said previous time interval occurs before said current time interval,
said previous time interval is substantially equal in duration to said current time interval,
said previous time interval is distinct from said current time interval,
said hashing said data uses a plurality of hashing functions, wherein and
said plurality of hashing functions comprise said hashing function; and
minimizing a number of some plurality of hashing functions used in said generating said PSV for a given probability of false positives, wherein
said DPM comprises a number of bits, and
said plurality of hashing functions used is proportional to a ratio of said number of bits in said DPM to a number of packets analyzed in a time period, wherein
said time period is the combined duration of said current time interval and said previous time interval,
said time period can be dynamically adjusted by changing the duration of said current time interval and said previous time interval, and
said analysis comprises
said causing said PSV generator to generate said PSV, and
said determining if said field of said DPM indicates said packet is said duplicate packet.

* * * * *

UNITED STATES PATENT AND TRADEMARK OFFICE
CERTIFICATE OF CORRECTION

| | | |
|---|---|---|
| PATENT NO. | : 8,451,817 B2 | Page 1 of 1 |
| APPLICATION NO. | : 10/626792 | |
| DATED | : May 28, 2013 | |
| INVENTOR(S) | : David R. Cheriton | |

It is certified that error appears in the above-identified patent and that said Letters Patent is hereby corrected as shown below:

In The Claims

Column 26
Line 17, in Claim 73, replace: "wherein and" by -- and --

Signed and Sealed this
Twenty-sixth Day of April, 2016

Michelle K. Lee
*Director of the United States Patent and Trademark Office*